United States Patent [19]
Wolfe

[11] 3,935,045
[45] Jan. 27, 1976

[54] METHOD OF RETREADING A TIRE

[75] Inventor: Merritt W. Wolfe, Akron, Ohio

[73] Assignee: The Goodyear Tire & Rubber Company, Akron, Ohio

[22] Filed: Oct. 26, 1973

[21] Appl. No.: 409,995

[52] U.S. Cl. ............... 156/96; 156/129; 156/394; 264/315; 264/326; 425/17
[51] Int. Cl.² ............... B29H 5/04; B29H 17/16
[58] Field of Search ....... 156/96, 128, 129, 394 FM, 156/394, 123, 133; 264/314, 315, 316, 326; 425/17, 31, 32, 33, 39, 40, 46

[56] References Cited
UNITED STATES PATENTS

| | | | |
|---|---|---|---|
| 2,228,212 | 1/1941 | Heintz | 156/96 |
| 2,343,724 | 3/1944 | Wheatley | 156/96 |
| 2,675,855 | 4/1954 | Heintz | 156/96 |
| 2,802,512 | 8/1957 | Rouse | 156/394 |
| 3,103,699 | 9/1963 | Gerard et al. | 425/405 H |
| 3,135,997 | 6/1964 | Smyser | 156/394 FM |
| 3,158,089 | 11/1964 | Fillol | 425/405 H |
| 3,232,816 | 2/1966 | Feilds | 156/394 |
| 3,325,326 | 6/1967 | Schelkmann | 156/96 |
| 3,492,180 | 1/1970 | Smith | 156/96 |
| 3,559,236 | 2/1971 | Merritt | 425/405 H |
| 3,689,337 | 9/1972 | Schelkmann | 156/96 |
| 3,779,830 | 12/1973 | Reppel | 156/96 |
| 3,797,979 | 3/1974 | Greenwood | 425/46 |
| 3,802,977 | 4/1974 | Wasko | 156/96 |
| 3,802,978 | 4/1974 | Barnett | 156/96 |
| 3,809,592 | 5/1974 | Dennis et al. | 156/394 |
| R15,120 | 6/1921 | Pfeiffer | 425/40 |

Primary Examiner—Douglas J. Drummond
Assistant Examiner—John E. Kittle
Attorney, Agent, or Firm—F. W. Brunner; H. E. Hummer

[57] ABSTRACT

A "full cap" method of retreading a tire with a previously molded and vulcanized tread in combination with unvulcanized rubber material which is placed adjacent the precured tread in the shoulder regions, or upper sidewall areas of the tire. Metal rings are placed over the unvulcanized rubber material and heated to mold in the unvulcanized material a pattern of grooves and recesses which esthetically blends with the design of the precured tread. Conventional techniques for heating and cementing the precured tread to the tire casing are used in recapping the tire.

12 Claims, 1 Drawing Figure

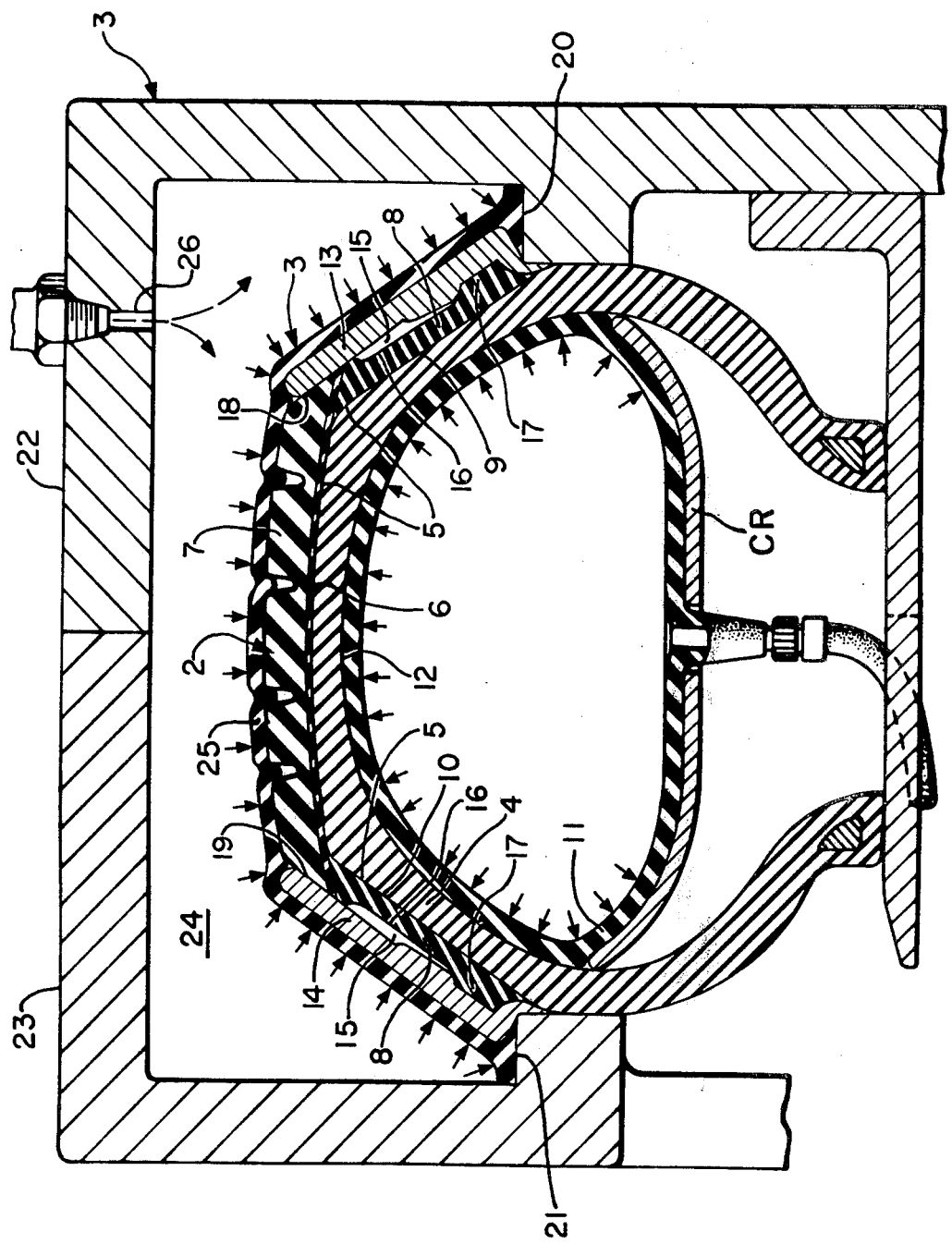

METHOD OF RETREADING A TIRE

BACKGROUND OF THE INVENTION

The invention is particularly well suited for use in recapping tires with a precured tread. In such recapping operations, the worn tread of a tire casing suitable for recapping, is removed by buffing and a precured tread is cemented to the buffed periphery of the tire casing. The precured tread and layer of cement are next covered by a fluid-impervious membrane, such as a piece of conventional innertubing. The assembly of tire casing, precured tread and membrane, is then subjected to a heated fluid, under pressure, for vulcanizing the layer of cement, whereby the precured tread is permanently bonded to the tire casing. In most cases, the precured tread is clearly distinguishable from the adjacent upper sidewalls of the tire, since no attempt is made to match the design of the two adjacent components. From a structural and operational standpoint, it is not necessary that the design of these two components match, but the esthetic appearance of the tire is highly improved if they do. The invention is directed to solving this particular problem by providing esthetically pleasing upper sidewalls which blend, in appearance, with the design of the precured tread.

Briefly stated, the invention is in a method of retreading a tire using a precured tread. The tire casing is first buffed in the areas of the tread and shoulders of upper sidewalls of the tire. A precured tread is positioned around the buffed periphery of the tire casing after a layer of vulcanizable cement is interposed between the precured tread and tire casing. Unvulcanized material is positioned on the buffed shoulder areas of the tire adjacent the precured tread. A pair of molding rings are then placed over the unvulcanized material. Conventional techniques used in (1) protecting the precured tread and unvulcanized rubber material from a heated curing medium, and (2) heating the assembly with the medium, are employed to bond the precured tread to the tire casing and mold and vulcanize a predetermined pattern of ribs and recesses in the unvulcanized material in the shoulder regions of the tire.

Description of the Invention

The following description of the invention will be better understood by having reference to the attached drawing which is a section of a portion of a recapped tire 2 in an apparatus 3 used in vulcanizing any uncured elastomeric material employed in the recapping process. The recapped tire 2 comprises a tire casing 4 with an outer periphery 5 which has been buffed in accordance with conventional full-cap retreading procedures normally employed when rebuilding the tread and upper sidewall areas of a tire with unvulcanized elastomeric material, e.g. natural or synthetic rubber. A layer of cement 6, normally employed in recapping tires with precured treads, is interposed between the tire casing 4 and a previously molded and vulcanized tread 7 which is positioned on the outer buffed periphery 5 of the tire casing 4. The cement 6 may be in the form of a liquid coating, or a layer of conventional cushion gum including a vulcanizing agent and accelerator, or a combination of both. Unvulcanized rubber material 8 is placed over one or both of the buffed upper sidewalls 9 and 10 of the tire casing 4 adjacent the precured tread 7, depending on whether it is desirable replacing the upper sidewall on one, or both sides of the tire 2. The unvulcanized rubber material 8 abuts the precured tread 7 and covers the buffed upper sidewall regions 9 and 10 of the tire casing 4.

The recapped tire 2, including the properly positioned precured tread 7 and unvulcanized material 8, is now ready for heating, molding, and vulcanization which can be accomplished by any of the conventional techniques presently employed for bonding precured treads to recappable tire casings. In the case of a pneumatic tire, for example, a regular curing tube 11 and rim CR, are placed within the cavity of the recapped tire 2.

A pair of frusto-conically shaped annular rings 13 and 14, somewhat similar to those shown in U.S. Pat. No. 2,343,724, are positioned over the uncured rubber material 8 in the upper sidewall regions 9 and 10 of the tire casing 4. The rings 13 and 14 are composed of any appropriate material, e.g. metal, and are each provided with a pattern of protuberances or projecting ribs 15 for molding correspondingly configured recesses or grooves 16 in the unvulcanized material 8. The rings 13 and 14, in this instance, are designed to mold an annular scuff rib 17 in each of the upper sidewalls 9 and 10 of the recapped tire 2. The mold rings 13 and 14 are in registry with the precured tread 7, i.e. they are designed to abut and partially overlap the opposing annualar sides 18 and 19 of the precured tread 7. The mold rings 13 and 14, in this case, are also designed for registry with a pair of annular stops 20 and 21 projecting from sections 22 and 23 of the kettle like apparatus 3 which, when closed, forms an enclosed chamber 24 for receiving a single tire.

A fluid impervious membrane, such as a conventional innertube 25, is placed over the precured tread 7 and mold rings 13 and 14 to prevent heated fluid, e.g. steam, from contacting the uncured cement 6 and rubber material 8. The tube 11 is inflated with air to exert a predetermined outward radial pressure against the inner periphery 12 of the tire casing 4. Saturated steam is forced through the inlet 26 of the kettle 3 into the steam chamber 24 for contacting the flexible, rubber membrane 25 covering the tire 2 positioned in the kettle 3, as shown in the drawing. The air pressure within the curing tube 11 and steam pressure against the membrane 25, designated by small arrows in the drawing, coact to hold the various components firmly in position until the cement 6 and rubber material 8 are vulcanized. The unvulcanized rubber material 8, used in the upper sidewalls 9 and 10, generally has the same good wear characteristics of the material of the precured tread 7, but in some cases it may be desirable using material having better heat resistant than wear resistant qualities, especially in bias, or bias-belted tires where the build-up of heat in the upper sidewalls 9 and 10 is somewhat greater than that of radial tires.

Thus, there has been described a method of full capping a tire with a precured tread and unvulcanized rubber material which is molded and vulcanized to blend in with the design of the precured tread. The mold rings can be configured to register with the precured tread, or a particular component of the kettle, or other apparatus in which the recapped tire is placed for heating and vulcanization. A tire fully capped in accordance with the invention resembles a new tire in that there is unitary design of tread and sidewalls.

The aforementioned process is essentially the same for full-capping a tire mounted on a rim and filled with foamed synthetic rubber, except that the conventional curing rim and tube are replaced by the foamed rubber as a means for exerting radial pressure against the inner crown of the tire.

What is claimed is:

1. A method of full-capping a tire comprising:
   a. buffing a tire casing to remove at least a portion of the worn tread and at least one upper sidewall of the tire casing;
   b. positioning a previously molded and vulcanized tread in surrounding relation around the tire casing, the precured tread extending beyond the buffed upper sidewall of the tire casing;
   c. interposing a heat-curable material between the precured tread and tire casing for bonding the tread to the casing;
   d. placing unvulcanized elastomeric material against the precured tread and buffed upper sidewall of the tire casing; and
   e. contacting the unvulcanized elastomeric material with a molding device to form a pattern of ribs and grooves in the unvulcanized elastomeric material while simultaneously heating the bonding and unvulcanized elastomeric material to temperatures sufficient to cause curing of the bonding material and vulcanization of the elastomeric material.

2. The method of claim 1, wherein forming a pattern of ribs and grooves in the unvulcanized elastomeric material includes (i) positioning a dish-like ring adjacent the unvulcanized elastomeric material, the ring including a pattern of ribs extending therefrom for forming correspondingly configured grooves in the unvulcanized elastomeric material, (ii) registering the ring with at least the precured tread, and (iii) heating the ring to correspondingly heat and vulcanize the unvulcanized elastomeric material.

3. The method of claim 2, wherein both upper sidewalls of the tire are buffed and a pair of rings are used for forming at least a pattern of grooves in the unvulcanized elastomeric material positioned on the tire casing in the upper sidewalls of the tire.

4. The method of claim 3, which includes covering at least the precured tread with a flexible, fluid-impervious elastomeric membrane, prior to heating the precured tread.

5. The method of claim 4, which includes covering both the precured tread and rings with a flexible, fluid impervious elastomeric membrane, and contacting the membrane with steam for a time sufficient to heat and vulcanize any unvulcanized elastomeric material.

6. The method of claim 5, which includes inflating a curing tube within the cavity of the recapped tire, prior to heating the unvulcanized elastomeric material.

7. The method of claim 5, wherein the unvulcanized elastomeric material is of the group consisting of natural and synthetic rubber.

8. The method of claim 7, wherein the rings are rigid and metallic.

9. The method of claim 8, wherein the unvulcanized elastomeric material in the sidewalls has better heat resistant characteristics than the elastomeric material of the precured tread.

10. The method of claim 1, wherein the molding device is a frusto-conically shaped, rigid annular metal ring including a surface for contacting the unvulcanized elastomeric material, the surface including a pattern of ribs projecting from the surface for forming correspondingly configured recesses in the material, the ring being free of the ground contacting surface of the precured tread and designed to contact only the annular sides of the precured tread.

11. The method of claim 10, including means carried by the ring for placing the ring in registry with the precured tread.

12. The method of claim 10, which includes means carried by the ring for forming an annular scuff rib.

* * * * *